Oct. 18, 1966     M. H. GROVE     3,279,747
VALVE BONNET CONSTRUCTION
Filed Jan. 23, 1964     2 Sheets-Sheet 1
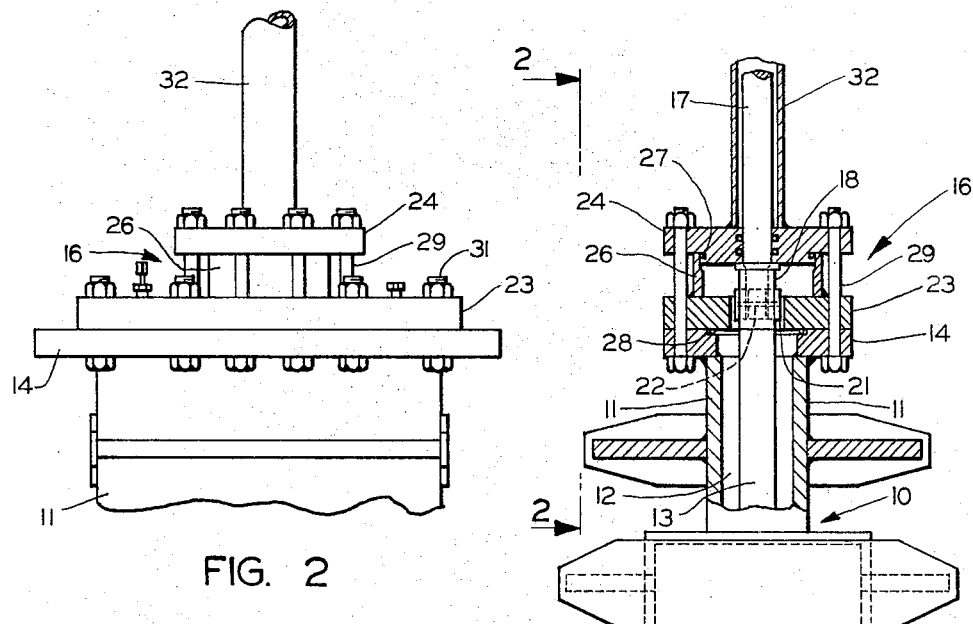
FIG. 2
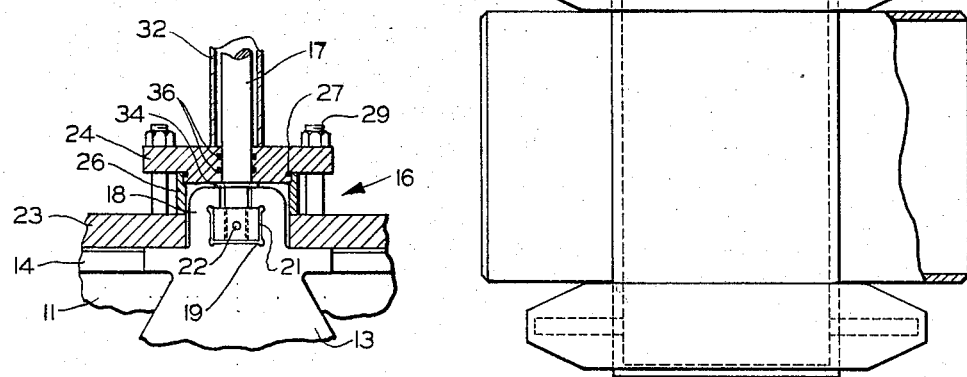
FIG. 3A
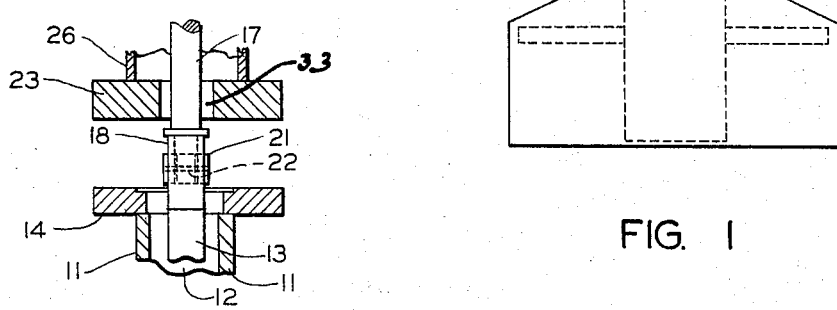
FIG. 3B
FIG. 1
INVENTOR.
MARVIN H. GROVE
BY
Flehr & Swain
ATTORNEYS Oct. 18, 1966   M. H. GROVE   3,279,747
VALVE BONNET CONSTRUCTION
Filed Jan. 23, 1964   2 Sheets-Sheet 2
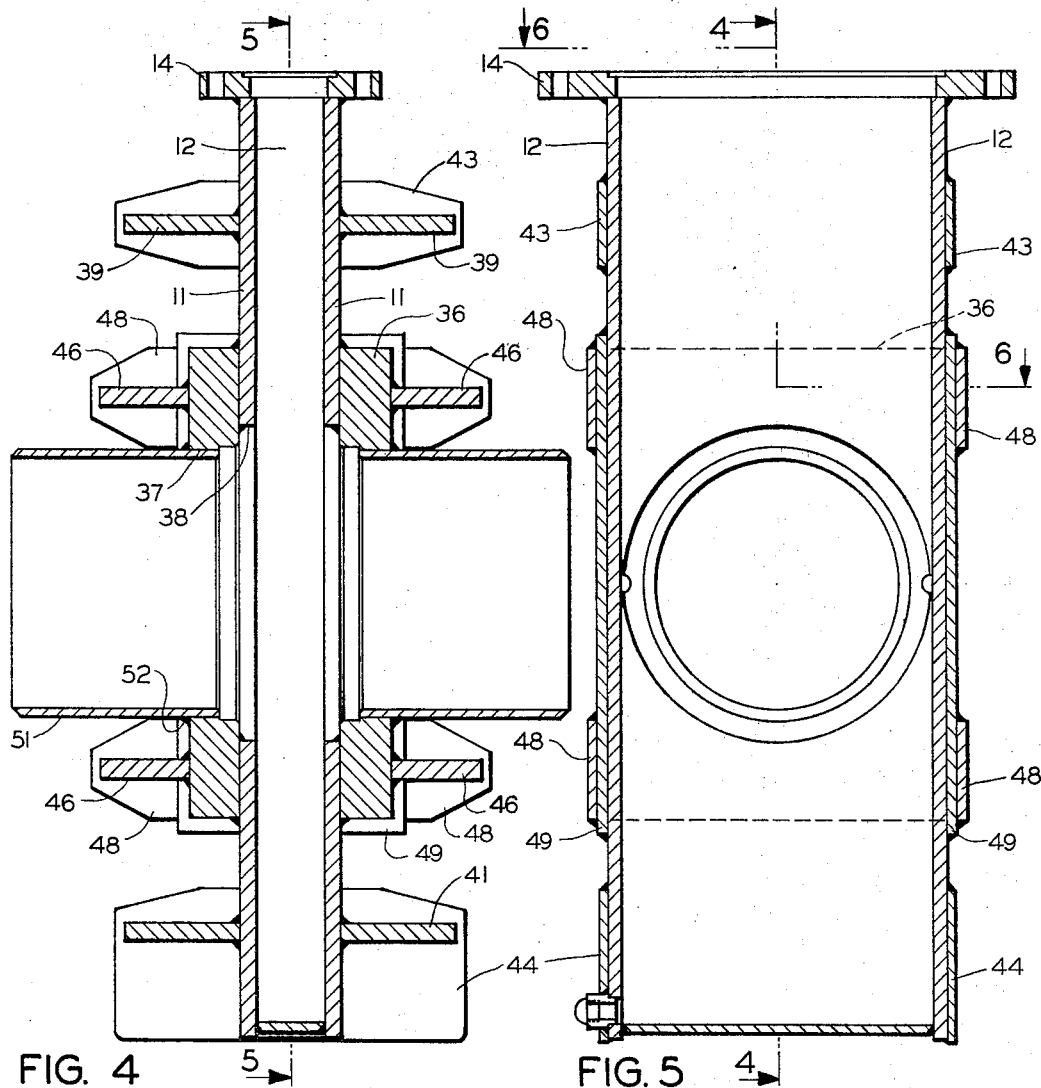
FIG. 4
FIG. 5
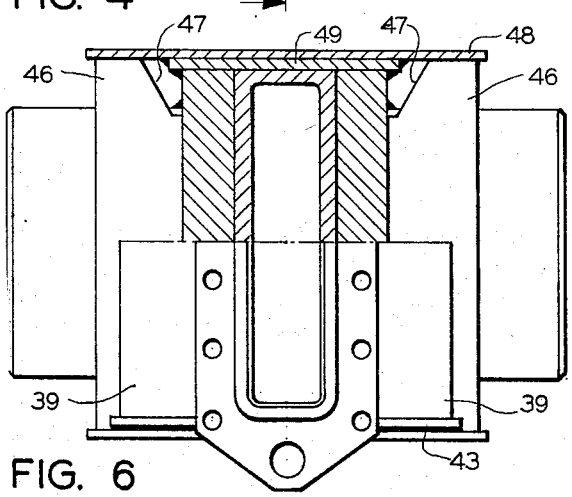
FIG. 6
INVENTOR.
MARVIN H. GROVE
BY
Flehr & Swain
ATTORNEYS

United States Patent Office 3,279,747
Patented Oct. 18, 1966

3,279,747
VALVE BONNET CONSTRUCTION
Marvin H. Grove, 340 Hillside Ave., Piedmont, Calif.
Filed Jan. 23, 1964, Ser. No. 339,706
2 Claims. (Cl. 251—329)

This invention relates to valves of the gate type such as are suitable for controlling flow of gases and liquids.

In the past it has been common to construct gate valves with bodies having a flange on one end to which bonnet means is mounted. Also, operating stems have been coupled to the gates by the use of a head (such as a neck) on the inner end of the stem which engages within a keyhole-shaped slot in one end portion of the gate. With such constructions when the gate is moved to its limiting position toward the bonnet, the stem and gate coupling means is within the body. Thus, if the bonnet means is then removed from the body the gate must thereafter be moved a further distance before the coupling means is exposed for detachment.

When valves as described above are of the through-port type with a gate having a port which registers with the flow passages for full open position, then that part of the body on the bonnet side of the hubs which carries the bonnet means is disproportionately long compared to the other part of the body. This makes for a body which is relatively heavy and massive compared to the body made possible by my invention.

In the past, valves having bodies made of fabricated mill steel have used hubs of relatively heavy cast steel. Theoretically, it is desirable to use ordinary steel pipe sections corresponding to the piping with which the valve is to be used. However, this presents certain problems, particularly in that it requires weld connections between the pipe sections and the body which will hold the line pressures applied, and at the same time take the stresses applied to the body from the associated piping with which the valve is connected.

In general it is an object of the present invention to provide a novel valve construction which facilitates certain assembly and disassembly operations, having reference particularly to the coupling and uncoupling of the valve stem with respect to the gate.

Another object of the invention is to provide a valve body construction which makes possible economies in manufacture, having reference particularly to the size and weight of the body.

Another object of the invention is to provide a valve body construction which permits the use of ordinary steel pipe sections as hubs.

Referring to the drawing:

FIGURE 1 is a side elevational view, partly in section, illustrating a valve in accordance with my invention;

FIGURE 2 is an end view of the upper portion of the valve shown in FIGURE 1;

FIGURE 3A is a detail in section showing the upper part of the valve with the gate in full open position, and illustrating the construction of the bonnet means, and the location of the parts which couple the operating rod to the gate;

FIGURE 3B is a section showing how the coupling means is exposed for disassembly when the bonnet means is removed;

FIGURE 4 is a cross-sectional view of the body incorporated in the valve of FIGURES 1-3, and showing the pipe sections employed as hubs, and the connections between these pipe sections and the body;

FIGURE 5 is a cross-sectional view taken along the line 5—5 of FIGURE 4;

FIGURE 6 is a cross-sectional view taken along the line 6—6 of FIGURE 5.

The valve illustrated in FIGURES 1 and 2 consist of a body 10 which is substantially rectangular in section, and consisting of parallel flat end walls 11, and connecting side walls 12. This body can be fabricated by welding from mill shapes, such as steel plates, plates and angles, or plates and channels.

Assuming that the valve is to be used for the higher operating pressures, then the walls are reinforced by suitable means as will be presently described. The valve gate 13 is of the flat slab or plate type, having parallel valve working surfaces, and preferably having a support which registers with the flow passages of the valve body for full open position.

A welding flange 14 is secured to one end of the body, and serves to carry the bonnet means 16. The valve operating rod 17 extends through the bonnet 16, and is coupled to the extension 18 of the valve gate. The coupling means consists of a nut 21, which forms an enlarged head, and which is threaded upon the stem. It can be held in place by a suitable lock pin 22. The nut together with the adjacent portion of the stem 17, is accommodated within the keyhole-shaped slot 19, formed in the gate extension 18.

The bonnet means illustrated consists of a bonnet plate 23, together with the head plate 24, and the intervening casing or shell 26. The shell 26 can be a short pipe section, which is welded or otherwise secured to the exterior face of the plate 23. The other end of the shell serves to seat the head plate 24. Suitable means, such as seal rings 27 and 28 of the O-ring type, serve to prevent leakage between the shell 26 and head plate 24, and between the bonnet plate 23 and the flange 14. These parts are clamped together and bolted to the flange 14 by the bolts 29, which are of sufficient length to extend through the head plate 24 and the flange 14. Additional bolts 31 extend through the flange 14 and the bonnet plate 23. Beyond the bonnet means the operating rod 17 is connected to suitable operating means, such as a hand wheel operator or any one of several motor means, including pneumatic and hydraulic cylinders, motors, and the like. Also the rod 17 may be protected by a suitable guard 32.

As shown particularly in FIGURES 3A and 3B, the plate 23 is provided with an elongated opening 33 dimensioned to accommodate the gate extension 18, whereby this extension occupies the position shown in FIGURE 3A when the valve plate is in one of its limiting positions. Suitable means such as the shim washers 34 can serve to limit the movement of the gate toward the bonnet. Other suitable means can be provided for limiting the other extreme position of the gate. The operating rod 17 is sealed with respect to the head plate 24 by suitable means, such as the seal rings 36 of the resilient O-ring type.

The construction described above greatly facilitates assembly and disassembly operations. Assuming that it is desired to disconnect the operating stem from the gate, it is only necessary to move the valve to full open position, by operating the hand wheel or other operating means employed, whereby the extension 18 is brought to the position shown in FIGURE 3A. Then after making certain that there is no fluid pressure in the body, the clamping bolts 29 and 31 are removed, and the bonnet assembly moved upwardly to a position as shown in FIGURE 3B. It will be seen that this exposes the extension 18 and the coupling nut 21 to the exterior of the body. Now by moving the stem 17 laterally of the gate, it can be uncoupled from the gate together with the nut 21. The same sequence of operations, but in reverse, can be used for coupling the operating rod to the gate.

It will be obvious from the foregoing that I have facilitated assembly and disassembly operations, having reference particularly to coupling and uncoupling operations between the stem and the gate. This facilitates factory and also field repair operations.

Although the features described above can be used with various valve body constructions, FIGURES 4-6 show a reinforced body made by fabrication. In this instance relatively heavy and massive plates 36 are disposed upon the end walls 11, and are welded thereto along the junctions between their outer peripheries and the adjacent surface of the walls 11. These massive plates, which may be square or rectangular, are provided with openings 37 which register with the somewhat larger openings 38 in the walls 11. Ribs 39 and 41 are shown welded to and extending across the exterior faces of the walls 11, to effect reinforcement against outward deflection.

As shown in FIGURE 6, the ends of the ribs 39 are cut away as indicated at 42, and are attached by welding to the side plates 43. The end ribs 46 are similarly formed and are attached by welding to the exterior faces of the plates 36. The ends of these ribs are shown cut away as indicated at 47, and are attached by welding to the side plates 48. Additional plates 49 extend across the side edges of the plates 36, and are secured thereto as by welding. It will be noted that the plates 48 which are attached to the ends of the ribs 46 overlap and are secured to the plates 49.

As previously stated, it is common for gate valves to have their hubs made of relatively heavy metal castings. The hubs 51 which I employ are made of pipe sections corresponding in wall thickness and tensile strength to the piping with which the valve is to be connected. The openings 37 in the massive plates 36 are dimensioned whereby the hubs 51 readily slide into the positions illustrated, and thereafter the hubs are secured to the massive plates 36 by the simple circular weld connections 52.

It may be explained at this point that ordinarily when a weld is applied about a pipe section, the weld metal accommodates stresses applied by internal fluid pressure. In a cylindrical pipe such stresses are ordinarily referred to as hoop stresses. Hoop stresses are such that a relatively heavy weld section is required for a given internal fluid pressure.

When a weld is made between such a pipe section and a relatively massive member like one of the plates 36, the circular weld is not subjected to hoop stress. On the contrary, the circular weld directly transmits forces from the cylindrical section to the relatively massive plate 36, whereby the adjacent portion of the pipe section is enforced against outward radial deflection. Although the circular weld 32 transmits force from the hub section to the massive plates 36, the relatively heavy and massive character of this plate is such that it is not subjected to any appreciable stress, and it does not deflect radially to any appreciable extent in carrying the forces applied through the weld connection 52. Thus the weld connection is not subject to hoop stress, but is subjected to stresses in compression.

In addition to hoop stresses by virtue of internal fluid pressure, the hubs are subjected to stresses applied from the associated piping with which they are connected. It has been found that a relatively simple circular weld 52 suffices to withstand all such stresses, that the welds transmit all of such stresses to the massive plates 36, and that these plates in turn readily withstand such stresses by virtue of their interconnection with the body and their interconnection by the plates 49.

The feature just described makes possible the use of relatively light weight hubs made of pipe sections corresponding to the piping with which the valve is to be used. The ability of such pipe sections to withstand internal pressure is actually enhanced by virtue of the weld connections 52 between the outer peripheries of the pipe sections and the massive plates 36. It will be noted in this connection that each weld connection 52 is located in spaced relationship with the inner end of the corresponding pipe section. Although the circular weld connection 52 can be made relatively simple without the use of excess weld metal, it is adequate to withstand the forces applied to the hubs from associated piping.

It will be noted that the body illustrated in FIGURES 4-6 is relatively symmetrical with respect to the position of the hubs. In other words, the extensions of the body upon opposite sides of the hubs are substantially equal in length. This is because of the bonnet construction described particularly in connection with FIGURES 3A and 3B. This feature makes possible economy in weight and size, since that part of the body which carries the bonnet assembly may be of a length comparable to the distance which the main part of the gate extends when in its full open position as distinguished from prior construction in which the body is of sufficient size to entirely contain the gate for all operating positions.

Reference is made to my copending application S.N. 253,416, filed January 23, 1963, for Valve Construction.

I claim:
1. In a valve construction, a valve body having substantially flat side and end walls, the end walls having aligned openings forming flow passages, a valve gate disposed within the body and movable between limiting positions corresponding to full open and closed positions of the valve, a flat flange mounted on one end of the body, a flat bonnet plate mounted upon said flange, a cylindrical bonnet casing secured to the outer face of said bonnet plate, a flat head plate seated upon said casing, bolting means removably securing the head plate to the bonnet plate with the bonnet casing clamped therebetween and for securing the bonnet plate to the flange, an operating rod, the head plate having an opening to slidably accommodate the operating rod, means for sealing the operating rod with respect to the head plate, the ends of the bonnet casing being sealed with respect to both the head plate and the bonnet plate, an extension upon one end of the valve gate which is nearest the operating rod, said extension having a width substantially less than the width of the main portion of the gate, an elongated opening in the bonnet plate dimensioned to accommodate said extension when the gate is in one of its limiting positions, a substantially keyhole-shaped slot within said extension, said operating rod being located within said slot, a nut on the operating rod and disposed within said slot and serving to retain the operating rod coupled to the gate, said nut for said one limiting position of the gate being located in a region exterior of the flange when said bonnet plate and said casing and head plate are disconnected from the flange and removed therefrom.

2. A valve as in claim 1 in which the valve gate has a port therein which registers with said openings for full open position of the valve, the extensions of the body on both sides of said openings being substantially equal.

References Cited by the Examiner

UNITED STATES PATENTS

| 2,626,775 | 1/1953 | Lange et al. | 251—328 |
| 2,870,987 | 1/1959 | Greenwood | 251—327 |
| 2,982,514 | 5/1961 | Bryant | 251—329 X |
| 3,063,079 | 11/1962 | Bergman et al. | 251—326 X |

FOREIGN PATENTS

| 1,152,283 | 9/1957 | France. |

M. CARY NELSON, *Primary Examiner.*

A. ROSENTHAL, *Assistant Examiner.*